D. C. TELLER.
Broiler.

No. 66,911.  Patented July 16, 1867.

WITNESSES:
E. B. Allen
Geo. M. Sibley

INVENTOR:
D. C. Teller

United States Patent Office.

D. C. TELLER, OF TERRE HAUTE, INDIANA.

Letters Patent No. 66,911, dated July 16, 1867.

STEAK-BROILER.

The Schedule referred to in these Letters Patent and making part of the same.

TO ALL WHOM IT MAY CONCERN:

Be it known that I, D. C. TELLER, of Terre Haute, in the county of Vigo, in the State of Indiana, have invented a new and improved Mode of Broiling Steaks and Toasting Bread; and I do hereby declare that the following is a full, true, and exact description thereof, reference being had to the accompanying drawings, and to the letters of reference marked thereon.

The nature of my invention consists in spreading steaks in a vertical position, one edge to the fire, around small wires or rods, the upper edge being caught upon these wires or rods, and also in placing bread to be toasted between these vertical wires or rods, and covering with a metal cap, having an inverted cone in the top, thereby making a uniform heat upon the steaks and bread, and rendering a speedy and effectual cooking of all parts at one time, and without any attention after the cooking commences.

To enable those skilled in the art to make and use my invention, I will proceed to describe its construction and operation.

Figure 1:
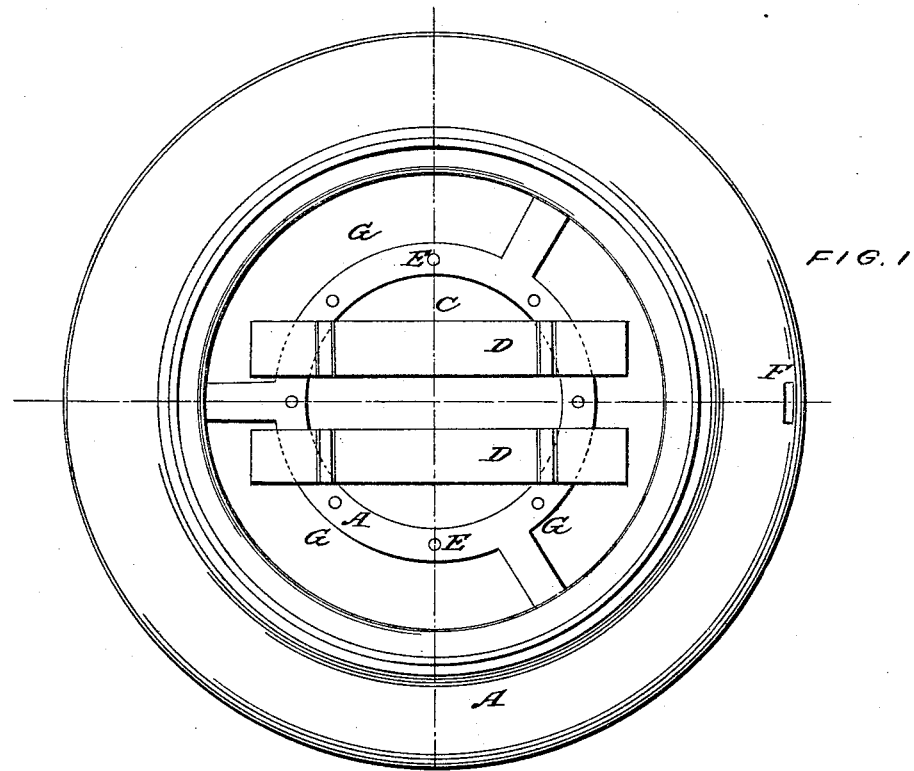
Figure 1 is a view of the broiler and toaster, with the cover removed.
Figure 2:
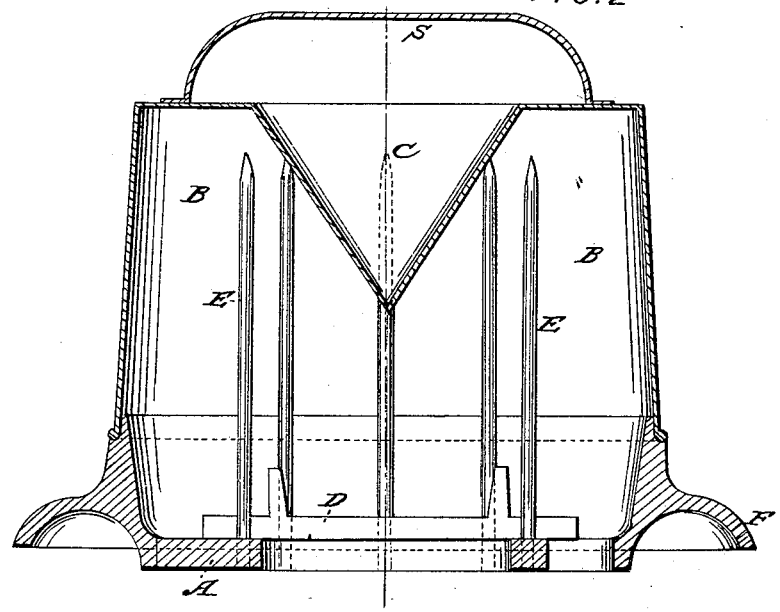
Figure 2 is a sectional view of the broiler, toaster, and cover.

The bottom of this apparatus consists of an inside and outside ring, as shown in fig. 1, A A, with open spaces between G G G G for the heat to pass up freely. E E are vertical wire rods inserted in the inside ring, with the upper ends sharpened. B B are a cover. It may be made of sheet iron, tin, or other light metal, and is provided with a handle, S, to remove it from the bottom when desired. C is an inverted cone in the top of the cover B, to deflect the heat. The whole apparatus may be made round or oblong shape, to fit the hole in a cooking-stove or range.

The mode of operation is as follows: Around the wires or rods the steaks are spread in a vertical position, one edge downward. The upper edge of the steaks being caught upon the wires or rods, and the cap or cover being placed on, the apparatus is placed over a hole or opening in the top of a stove or range, with the fire beneath. In this position the heat is applied to both sides of the steaks at the same time, requiring no further attention for cooking. For toasting, slices of bread are placed edgeways on the movable plates D D, to prevent the lower edges from burning. These plates are only used for toasting. By inserting a stove-hook or handle in the opening F, the apparatus may be removed when desired. This apparatus is very simple and useful.

What I claim as my invention, and desire to secure by Letters Patent, is—

The vertical position in which the steaks are placed over the fire, and the arrangement of the vertical rods E E, all substantially enclosed, with the cap C, as specified for the purposes in the specification.

D. C. TELLER.

Witnesses:
 E. B. ALLEN,
 GEO. M. SIBLY.